United States Patent Office 2,763,696
Patented Sept. 18, 1956

2,763,696

PRODUCTION OF ALPHA,BETA-UNSATURATED ALCOHOLS

Harry De V. Finch, Berkeley, and Kenneth E. Furman, Richmond, Calif., assignors to Shell Development Company, Emeryville, Calif., a corporation of Delaware No Drawing. Application July 28, 1952,
Serial No. 301,396

14 Claims. (Cl. 260—638)

This invention relates to the production of unsaturated alcohols, and it is more particularly directed to a method whereby alpha,beta-olefinic aldehydes or ketones are reduced by direct hydrogenation in the vapor phase to the corresponding alpha,beta-unsaturated alcohols. An example of this reaction is the conversion of acrolein to allyl alcohol.

It is known that when an alpha,beta-olefinic carbonylic compound is hydrogenated in the vapor phase, three principal product compounds are formed. One is the corresponding alpha,beta-olefinic alcohol, whereas the others are the saturated alcohol and the saturated carbonylic compound. The total percentage of the carbonylic reactant which is converted to these and other products formed during the reaction (which is referred to herein as the "conversion" or the percent conversion") depends on the reaction conditions and can be as high as 90%–100%. However, the art shows that if vigorous reaction conditions leading to a high conversion of the carbonylic reactant are employed, the yield of the desired unsaturated alcohol product generally decreases to uneconomical levels. It may be here noted that the term "yield" is employed to designate the percentage of said converted portion of the carbonylic reactant which goes to the indicated product compound, reference normally being had to the yield of the alpha,beta-olefinic alcohol product unless another product is specifically referred to.

It is a general object of this invention to provide an efficient method for reducing alpha,beta-(olefinically) unsaturated carbonylic reactants by catalytically hydrogenating the same in the vapor phase to the corresponding alpha,beta-unsaturated primary or secondary alcohols containing the same number and arrangement of carbon atoms as the carbonylic reactant. A more particular object is to effect said reduction under conditions resulting in both a high overall conversion of the carbonylic reactant as well as in a relatively high yield of the desired alpha,beta-olefinic alcohol product. A still further object is to provide a method of this character which is particularly well adapted for use in the reaction wherein acrolein is converted to allyl alcohol. The nature of still other objects of this invention will be apparent from a consideration of the descriptive portion to follow.

It is our discovery that alpha,beta-olefinic carbonylic reactants can be efficiently reduced to the corresponding alpha,beta-unsaturated alcohols by passing a gaseous feed mixture containing the carbonylic reactant, together with a large excess of hydrogen, through a catalyst comprising cadmium and a proper amount of a catalyst having hydrogenating-dehydrogenating characteristics, the reaction being conducted under controlled conditions of temperature, pressure and ratio of hydrogen to unsaturated carbonylic compound. While the latter conditions will be considered below in detail, they may here be briefly stated as comprising the use of at least 7 moles of hydrogen per mole of alpha,beta-olefinic carbonyl compound present, temperatures in the range of from about 210° C. to 280° C., most preferably about 215° C. to about 240° C., and pressures of from about 300 to 750 p. s. i. g.

The alpha,beta-olefinic aldehydes and ketones which can be selectively reduced to the corresponding unsaturated primary or secondary alcohols by the process of the present invention have a structure that can be represented by the general formula

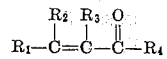

wherein the various radicals indicated by $R_1$, $R_2$, $R_3$ and $R_4$, which can be the same as or different from one another, represent hydrocarbon radicals or hydrogen atoms. When $R_4$ represents a hydrogen atom the structure is that of an aldehyde, whereas when $R_4$ is a hydrocarbon radical the structure is that of a ketone. Representative aldehydes which can be selectively reduced in accordance with the process of the present invention are acrolein, methacrolein, crotonaldehyde, tiglic aldehyde, alpha-ethyl acrolein, beta-methyl crotonaldehyde, alpha,beta-dimethyl crotonaldehyde, beta-ethyl crotonaldehyde, cinnamaldehyde, alpha - methyl - beta - isopropyl acrolein, alpha-pentyl-beta-propyl acrolein and 2-hexenal. The alpha,beta-unsaturated aldehydes constitute a preferred class of reactants for use in this invention. A still more preferred class of reactants is made up of those compounds wherein, in the general formula given above, $R_4$ is hydrogen and $R_1$, $R_2$ and $R_3$ are members selected from the group consisting of alkyl radicals and hydrogen atoms. Representative compounds falling into this more preferred class are acrolein, methacrolein, crotonaldehyde and the like. However, in practicing the present invention good results have also been obtained with alpha,beta-olefinic ketones, exemplary reactants of this class being methyl vinyl ketone, ethyl vinyl ketone, methyl 2-propenyl ketone, methyl isopropenyl ketone, vinyl cyclohexyl ketone, vinyl phenyl ketone, cyclohexenyl isopropenyl ketone, undecen-5-one-4, and di(2-propenyl) ketone.

As stated above, we have found that it is necessary to observe certain conditions of operation if the desired high conversion of the carbonylic reactant and high yield of the alpha,beta-olefinic alcohol are to be obtained. Firstly, the gaseous feed stream which is passed through the catalyst bed at elevated temperatures and pressures should be one in which the mole ratio of hydrogen to the unsaturated reactant is at least 7:1, and preferably is from about 10:1 to about 15:1. When this ratio falls appreciably below 7:1, both the conversion of the carbonylic reactant as well as the yield of the desired unsaturated alcohol are seriously impaired. Thus, whereas conversions of 95% to 100% and unsaturated alcohol yields in excess of 50% can be obtained at hydrogen/carbonylic reactant mole ratios above about 10:1, reducing this ratio to a value of about 6:1 has the effect of lowering the conversion to about 79% and the yield to about 43%, other conditions of operation remaining the same. On the other hand, while the ratio may be increased to a value above 15:1 without seriously impairing the conversion of yield, the costs of the operation are increased since the overall production of a given unit is necessarily decreased while at the same time added equipment costs are encountered due to the fact that unduly large volumes of hydrogen must be handled in the product stream. It is surprising that excess hydrogen, particularly in such large amounts, is beneficial in this reaction in which it is important to minimize hydrogenation of the olefinic double bond, but it has been found that not only are high yields of olefinic alcohols at high conversions obtained in this way, but also deposition of material on the catalyst and plugging of the reactor tube with consequent interruption of operations are thus avoided. Provided that the correct mole ratio of hydrogen to unsaturated reactant is observed, the feed stream may contain one or more inert gaseous diluents such as nitrogen, carbon dioxide or the like. Further, the feed stream may contain minor percentages of one or more of the various product compounds which are formed during the reaction. In the preferred practice of our invention, however, a total of at least 50% by volume of the feed stream is made up of the hydrogen and carbonylic reactants.

It has also been found to be important to maintain the gaseous feed stream passed through the catalyst under a pressure of at least 300 p. s. i. g., and preferably below 750 p. s. i. g. Thus, while the high conversions and yields indicated above can be obtained at 500 p. s. i. g., the conversion drops to about 70% to 75% at 200 p. s. i. g. and to a value below 40% at 100 p. s. i. g., though the yield in most cases remains the same. The use of pressures above about 750 p. s. i. g. is disadvantageous since it tends to decrease the unsaturated alcohol yield and also imposes added equipment expense due to the higher costs of apparatus capable of withstanding these more elevated pressures.

The catalyst employed in the present invention is one which contains cadmium, together with one or more additional catalysts of the class known to have hydrogenating-dehydrogenating characteristics. The cadmium can be in the metallic form or in the form of cadmium oxide or, as is more usually the case, a mixture of metallic cadmium with cadmium oxide. Generally, in such mixtures the metallic cadmium predominates and, most preferably, at least 90% of the cadmium content is metallic cadmium which can be in the form of an alloy with the other metal or metals used. The heavy metals selected from the first, second, sixth and eighth groups of the periodic table of the elements, as represented by iron, copper, silver, zinc, titanium, chromium, nickel, molybdenum, tungsten, cobalt and manganese, for example, all possess the requisite hydrogenating-dehydrogenating characteristics when employed in the metallic form or, in many cases, as an oxide or other compound of the metal. Among these combinations, metallic copper and/or silver with the cadmium have been found to be especially advantageous and give the highest yields of unsaturated alcohols in the process of the invention. The components of the catalyst can be employed in either the unsupported state or they can be supported in the usual fashion on a carrier such as silica, alumina, kieselguhr or other diatomaceous earth material, pumice, or the like. The catalyst, including the supporting material, if one is used, can be in the form of a fine powder or in the form of compacted pellets or other shaped or unshaped fragments.

As regards the proportion of the several components of the catalyst composition, good results are obtained with catalysts containing from about 3% to 40% cadmium, with the balance of the catalyst being made up of the catalytic material having hydrogenating-dehydrogenating characteristics. However, a preferred catalyst composition is one which contains from about 5% to 30% cadmium and the balance the hydrogenating-dehydrogenating component. As the amount of cadmium employed is increased materially beyond about 40%, it is necessary to employ proportionately higher reaction temperatures in order to achieve the desired high level of conversion, and since the use of higher temperatures unfavorably influences the yield of the alpha,beta-unsaturated alcohol product, the use of a catalyst containing less than 40% of cadmium is recommended. Similarly, when the cadmium content of the catalyst is less than about 3%, the yield of alpha,beta-unsaturated alcohol is seriously impaired. The percentages employed in this paragraph are taken without regard to the amount of any inert modifying or supporting material which may be present in the catalyst.

The cadmium component of the catalyst can be prepared in any convenient manner. Thus, cadmium hydroxide can be precipitated from a solution of cadmium acetate, cadmium nitrate or other soluble cadmium salt, and the precipitate then converted to the oxide by heating at about 400° C. for several hours. Alternatively, one can impregnate a support, as alumina, silica or the like, with a solution of cadmium nitrate or other cadmium salt, following which the impregnated support is calcined at about 300° C. to 400° C. in a current of air for two or three hours in order to decompose the salt to cadmium oxide, and preferably then reducing the oxide with hydrogen. The cadmium component of the catalyst can be combined with the hydrogenating-dehydrogenating component thereof by any one of several known methods. Thus, the already formed metallic cadmium and/or cadmium oxide can be physically admixed with a material such as reduced copper, silver or the like in proper proportions. Alternatively, a suitable supporting material can be impregnated with a solution of both a cadmium salt as well as that of a metal such as copper, nickel or other heavy metal, with the resulting impregnated support first being calcined in air and then reduced with hydrogen.

The preferred form of catalyst is prepared by coprecipitating a mixture of a reducible cadmium compound and a reducible compound of metal having hydrogenating-dehydrogenating properties which is to be used therewith. The precipitate can be dried and used as such for catalyzing the hydrogenation according to the invention; or, more preferably, the precipitate can be calcined and reduced to the metallic state prior to such use. For example, a mixture of cadmium hydroxide and a hydroxide of the chosen suitable metal, e. g. copper hydroxide can advantageously be coprecipitated and the resulting precipitate heated, for example, at about 300° C. to 500° C. for 2 to 8 hours, and preferably in a current of air, to decompose the hydroxides. The calcined material is preferably then reduced, for instance, in a stream of hydrogen gas at about 250° C. to 350° C., preferably 275° C. to 325° C., for about two to five hours, to activate the catalyst. Such coprecipitated catalysts have been found to be of special advantage in the new process where they have been consistently superior to other forms of catalyst.

Especially desirable catalysts are produced by coprecipitating, as above described, the cadmium and hydrogenating-dehydrogenating components in the presence of porous siliceous material in finely divided form. The incorporation of such material with the coprecipitated catalyst appears to reduce the crystallite size of the cadmium-other metal particles and to increase the total porosity of the mixture making is effective at lower temperatures. Diatomaceous earth is an especially advantageous form of siliceous material for this purpose. It is preferred to use between about 10% and about 75%, most preferably 20% to 50%, of diatomaceous earth based on the total weight of the catalyst. Suitable supports may be used with these catalysts as with the other forms of the catalyst which are useful in the invention.

As previously pointed out, for best results it is important to control the reaction temperature so that it is maintained within the range from about 210° C. to about 280° C. in at least that portion of the catalyst bed wherein the predominant amount of the reaction occurs and, most preferably, temperatures above about 280° C. are avoided at any point in the catalyst bed. With the preferred coprecipitated catalysts containing diatomaceous earth as a crystallite size and porosity regulator lower temperatures can be successfully employed than with other forms of the cadmium-containing catalysts used in the process. Suitable temperatures for reaction with diatomaceous earth-containing catalysts are from about 210° C. to about 250° C., preferably 215° C. to 240° C. With the catalysts prepared without the use of diatomaceous earth as crystallite size and porosity regulator, reaction temperatures in the range of about 250° C. to about 280° C. are used, temperatures of about 260° C. to 280° C. being preferred. When temperatures below about 210° C. are employed with either type of catalyst, the conversion of the unsaturated reactant falls off sharply and the yield of the desired product alcohol also falls off to a considerable extent. Thus, while it is possible to obtain conversions of 95% to 100% and unsaturated alcohol yields in excess of 50% by operating at 220° C.–225° C. with coprecipitated diatomaceous earth-containing catalysts, the conversion falls to about 65% and the yield to 40% to 45% when temperatures of about 200° C. are used. Conversely, while the use of reaction temperatures above about 250° C. has little effect on the conversion, the yield of unsaturated alcohol is seriously impaired and in many cases falls to a value below 30% when using the diatomaceous earth-containing catalysts. But, the same catalysts prepared without diatomaceous earth give excellent yields and conversions at temperatures of 270° C. to 280° C., higher temperatures causing loss of yield.

The process of the invention can be practiced either by passing the feed mixture through a fixed catalyst bed or through a reactor wherein the catalyst is present in finely divided form and is maintained in the "fluidized" state by the upward passage therethrough of the gaseous reactants. The process is most conveniently carried out in a continuous manner, although intermittent types of operation can be employed. In the preferred method of continuous operation the components of the feed stream are brought together and, under the desired pressure, are passed in the vaporous condition through a suitable catalyst heated to the desired temperature. The reaction zone advantageously is an elongated tube or tubes wherein the catalyst is positioned. The feed can be brought into the catalyst in either the unheated or preheated condition. The effluent from the reactor can then be separated into its various constituents by conventional means, the most convenient of which is that of fractional distillation. If desired, any unconverted portion of the carbonylic reactant present in the effluent can be recirculated through the catalyst in the reactor, preferably admixed with fresh feed gases.

The rate at which the feed gases are passed through the heated catalyst bed is not critical, and good results have been obtained with flow rates varying from as low as a total of 10 moles of the feed gases per liter of catalyst per hour to rates as high as a total of about 400 moles of the feed gases per liter of catalyst per hour.

The process of the present invention is illustrated in the examples given below. The catalysts employed in these examples were prepared by coprecipitating copper hydroxide and cadmium hydroxide, in varying relative amounts, by the addition of caustic to an aqueous solution of the respective nitrate salts. In the cases of catalysts numbered 1 to 3 in the tables given in the examples, the solution of the nitrate salts contained a suspension of a siliceous filter-aid (Johns-Manville, Celite Analytical Filter-Aid, which is a diatomaceous silica composed of porous, cellular particles of nearly pure amorphous silica as described in Johns-Manville's brochure on "Celite Mineral Fillers" of May 1943) in an amount sufficient to make up approximately 28% by weight of the finished catalyst, while the catalyst numbered 4 was prepared without the use of any filter-aid. In either case, the slurry obtained on precipitating the hydroxides was stirred, filtered and water washed, after which it was again slurried with water, filtered and washed with water until neutral. The filter cake was then dried at 100° C., calcined at 400° C. for from 2 to 6 hours, and then ground and pelleted. The pellets were reduced in a stream of hydrogen at 275° C. to 325° C. for 3 hours, following which the pelleted catalyst was considered to be ready for use. In designating the relative concentration of copper and of cadmium in the catalysts employed in the various examples given below, the amount of any filter-aid present in the pellets is not taken into account.

EXAMPLE I

The data presented in this example illustrate the importance of conducting the process of the present invention at a proper temperature. The operation was conducted by passing a gaseous mixture of acrolein and hydrogen, in a hydrogen/acrolein mole ratio of about 12:1, through the pelleted catalyst for a period of approximately two hours at an average rate of about 90 moles of total feed per liter of catalyst per hour. The temperature in the catalyst bed was maintained at the desired level by external heating of the reactor. During the run the pressure in the system was maintained at 500 p. s. i. g. The results of this operation are given in the following table:

Table I

| Catalyst No. | Catalyst Composition | Temp. (Max.) °C. | Conversion (Percent Acrolein converted to all products) | Yield (Percent Converted acrolein going to allyl alcohol) |
|---|---|---|---|---|
| 1 | 74% Cu, 26% Cd | 200 | 66.1 | 45.9 |
| 1 | 74% Cu, 26% Cd | 225 | 96.6 | 51.8 |
| 1 | 74% Cu, 26% Cd | 270 | 98.2 | 32.7 |
| 1 | 74% Cu, 26% Cd | 320 | 100 | 3.6 |
| 2 | 94% Cu, 6% Cd | 200 | 63.4 | 43.5 |
| 2 | 94% Cu, 6% Cd | 226 | 94.5 | 51.7 |
| 2 | 94% Cu, 6% Cd | 280 | 100 | 21.3 |

EXAMPLE II

The effect on the optimum reaction temperature of omitting the Celite filter-aid from the coprecipitated copper-cadmium catalysts is shown by the following results obtained under conditions otherwise the same as those used in Example I:

Table II

| Catalyst No. | Catalyst Composition | Maximum Reaction Temp., °C. | Conversion (Percent Acrolein converted to all products) | Yield (Percent converted acrolein going to allyl alcohol) |
|---|---|---|---|---|
| 4 | 74% Cu, 26% Cd | 225 | 24 | 40 |
| 4 | 74% Cu, 26% Cd | 275 | 98 | 49 |
| 4 | 74% Cu, 26% Cd | 300 | 100 | 26 |

EXAMPLE III

The conditions employed in this operation were the same as those described in Example I above, except that here the temperature in the catalyst bed was maintained at 225° C. in all cases, while the pressure in the system was varied as indicated below in Table III:

Table III

| Catalyst No. | Catalyst Composition | Pressure, p. s. i. g. | Conversion (Percent acrolein converted to all products) | Yield (Percent converted acrolein going to allyl alcohol) |
|---|---|---|---|---|
| 1 | 74% Cu, 26% Cd | 0 | 5 | 28.5 |
| 1 | 74% Cu, 26% Cd | 100 | 37 | 50 |
| 1 | 74% Cu, 26% Cd | 200 | 74 | 52.8 |
| 1 | 74% Cu, 26% Cd | 500 | 97 | 51.8 |

EXAMPLE IV

The operation of this example was also conducted in accordance with the general procedure described in Example I. Here, however, the temperature was maintained constant at 225° C., and the total pressure within the system was kept at 500 p. s. i. g. while the hydrogen partial pressure was varied. This change in the hydrogen partial pressure had the effect of altering the mole ratio of hydrogen to acrolein in the feed, as indicated in Table IV below:

Table IV

| Catalyst No. | Catalyst Composition | Mole Ratio hydrogen/ acrolein | Conversion (percent acrolein converted to all products) | Yield (percent converted acrolein going to allyl alcohol) |
| --- | --- | --- | --- | --- |
| 1 | 74% Cu, 26% Cd | 26.0 | 99.0 | 52.0 |
| 1 | 74% Cu, 26% Cd | 11.6 | 96.6 | 51.8 |
| 1 | 74% Cu, 26% Cd | 10.4 | 90.5 | 49.5 |
| 1 | 74% Cu, 26% Cd | 5.5 | 79.0 | 43.3 |
| 1 | 74% Cu, 26% Cd | 2.7 | 29.7 | 21.9 |

EXAMPLE V

The suitability of catalysts prepared by coprecipitation as previously described, except that different proportions of the filter-aid were used, is illustrated by the following results using catalysts containing copper and cadmium in the proportion 74:26 for the hydrogenation of acrolein at 225° C. and 500 p. s. i. g. pressure with a mole ratio of hydrogen to acrolein of 12:1 and a feed rate of about 90 moles of total feed per liter of catalyst per hour:

Table V

| Percent Filter Aid based on the total weight of catalyst | Conversion (percent acrolein converted to all products) | Yield (percent converted acrolein going to allyl alcohol) |
| --- | --- | --- |
| 28 | 97 | 51.8 |
| 43 | 94 | 49.2 |
| 69 | 91 | 46.0 |

EXAMPLE VI

The undesirability of high proportions of cadmium in the catalyst is shown by the following results of tests carried out under the conditions of Example V using reaction temperatures of 225°–240° C.

Table VI

| Catalyst No. | Catalyst Composition | Conversion (percent acrolein converted to all products) | Yield (percent converted acrolein going to allyl alcohol) |
| --- | --- | --- | --- |
|  | 99.3% Cu, 0.7% Cd | 100 | [1] zero |
| 2 | 94% Cu, 6% Cd | 95 | 51.7 |
| 1 | 74% Cu, 26% Cd | 97 | 51.8 |
| 3 | 50% Cu, 50% Cd | 100 | 30. |

[1] Product 95% propanol.

EXAMPLE VII

The effectiveness of combinations of cadmium with other catalysts having hydrogenation-dehydrogenation properties, other than copper which was used in the foregoing examples, is illustrated by the following results for a silver-cadmium catalyst made by coprecipitation in the same manner as the catalysts of Examples I and VI and containing a weight ratio of silver to cadmium of 84:16 and a Celite filter-aid content of 22% by weight of the total catalyst: In the hydrogenation of acrolein at 230° C. and 500 p. s. i. g., using a hydrogen to acrolein mole ratio of about 12:1, a conversion of acrolein of 94%–95% and a yield of allyl alcohol of 38.3%, based on the acrolein converted, were obtained.

EXAMPLE VIII

Illustrative of the results obtainable in the hydrogenation of other alpha, beta-olefinic carbonyl compounds to the corresponding olefinic alcohols are those obtained with methyl isopropenyl ketone, methacrolein and crotonaldehyde using catalyst No. 1 at 225° C., 500 p. s. i. g. pressure, and a hydrogen to olefinic carbonyl compound mole ratio of about 12:1.

Table VII

| Alpha, beta-Olefinic Carbonyl Compound | Conversion (percent to all products) | Yield (percent of Converted Carbonyl Compound to Olefinic Alcohol) |
| --- | --- | --- |
| Methyl isopropenyl ketone | 93 | 36 |
| Methacrolein | 95 | 75 |
| Crotonaldehyde | 95 | 73 |

It will thus be seen that the new process offers many advantages, is widely applicable to a great variety of different alpha,beta-olefinic carbonyl compounds, and can be varied in many ways. It will therefore be understood that the invention is not limited to the exemplary operations described by way of illustration nor by any theory proposed in explanation of the improved results which are obtained.

We claim as our invention:

1. A process of producing alpha,beta-olefinic alcohols from the corresponding olefinc carbonylic compounds which comprises reacting an olefinic carbonylic compound of the group consisting of alpha-beta-olefinic aldehydes and alpha,beta-olefinic ketones in the vapor phase with hydrogen present in an amount equal to at least seven moles per mole of said olefinic carbonylic compound at a temperature between 210° C. and about 280° C. and under a pressure of 300 to 750 p. s. i. g. in the presence of a catalytic mixture comprising cadmium, predominantly in the metallic state, and a heavy metal hydrogenating-dehydrogenating catalyst in the metallic state selected from the group consisting of copper and silver and mixtures of such metals in proportions of about 3% to about 30% by weight of cadmium to 97% to 70% of said heavy metal.

2. A process in accordance with claim 1 wherein the catalyst is a mixture of cadmium and copper in the proportions of 5 to 30 parts of cadmium to 95 to 70 parts of copper.

3. A process in accordance with claim 1 wherein the catalyst is a mixture consisting essentially of cadmium and copper with a siliceous carrier formed by coprecipitating compounds of these metals in the presence of a porous siliceous material in a finely divided state.

4. A process in accordance with claim 3 wherein the reaction is carried out at between 215° C. and 240° C., using a mole ratio of hydrogen to said olefinic carbonylic compound of about 10:1 to 15:1.

5. A process of producing an alpha,beta-olefinic secondary alcohol which comprises reacting an alpha, beta-olefinic ketone in the vapor phase with hydrogen present in an amount equal to at least 7 moles per mole of said olefinic ketone at a temperature of 210° C. to about 280° C. and under a pressure of at least 300 p. s. i. g. in the presence of a catalytic mixture comprising cadmium, predominantly in the metallic state, and a heavy metal hydrogenating-dehydrogenating catalyst in the metallic state selected from the group consisting of copper and silver and mixtures of such metals in proportions of about 3% to about 30% by weight of cadmium to 97% to 70% of said heavy metal.

6. A process in accordance with claim 5 wherein the catalyst is a mixture of cadmium and copper in the proportions of 5 to 30 parts of cadmium to 95 to 70 parts of copper.

7. A process in accordance with claim 5 wherein the catalyst is a mixture consisting essentially of cadmium and copper with a siliceous carrier formed by coprecipitating compounds of these metals in the presence of a porous siliceous material in a finely divided state.

8. A process in accordance with claim 7 wherein the reaction is carried out at between 215° C. and 240° C., using a mole ratio of hydrogen to said olefinic ketone of about 10:1 to 15:1.

9. A process of producing an alpha,beta-olefinic primary alcohol which comprises reacting an alpha,beta-monoolefinic aldehyde in the vapor phase with hydrogen present in an amount equal to at least 7 moles per mole of said olefinic aldehyde at a temperature of 210° C. to about 280° C. and under a pressure of at least 300 p. s. i. g. in the presence of a catalytic mixture comprising cadmium and a heavy metal hydrogenating-dehydrogenating catalyst in the metallic state selected from the group consisting of copper and silver and mixtures of such metals in proportions of about 3% to about 30% by weight of cadmium to 97% to 70% of said heavy metal, at least 90% of said cadmium content being metallic cadmium.

10. A process in accordance with claim 9 wherein the catalyst is a mixture of cadmium and copper in the proportions of 5 to 30 parts of cadmium to 95 to 70 parts of copper.

11. A process in accordance with claim 9 wherein the catalyst is a mixture consisting essentially of cadmium and copper with a siliceous carrier formed by coprecipitating compounds of these metals in the presence of a porous siliceous material in a finely divided state.

12. A process in accordance with claim 11 wherein the reaction is carried out at between 215° C. and 240° C. using a mol ratio of hydrogen to said olefinic aldehyde of about 10:1 to 15:1.

13. A process of producing allyl alcohol from acrolein which comprises passing acrolein in the vapor phase in admixture with hydrogen in a mole ratio of 7 to 15 moles of hydrogen per mole of acrolein at 210° C. to 280° C. and under a pressure of 300 to 750 p. s. i. g. over a catalytic mixture of metallic cadmium and copper present in the proportions of 5 to 30 parts of cadmium to 95 to 70 parts of copper.

14. A process in accordance with claim 13 wherein the reaction is carried out at between 215° C. and 240° C. with a catalyst formed by coprecipitating compounds of cadmium and copper in the presence of sufficient of a diatomaceous earth to make the diatomaceous earth content of the final catalyst about 10% to 75% by weight.

References Cited in the file of this patent

UNITED STATES PATENTS

| | | |
|---|---|---|
| 2,009,948 | Schmidt | July 30, 1935 |
| 2,340,687 | Richardson et al. | Feb. 1, 1944 |

FOREIGN PATENTS

| | | |
|---|---|---|
| 220,742 | Switzerland | Apr. 30, 1942 |
| 619,014 | Great Britain | Mar. 2, 1949 |